(12) United States Patent  (10) Patent No.: US 8,713,404 B2
Fai et al.  (45) Date of Patent: Apr. 29, 2014

(54) CONTROLLER INTERFACE PROVIDING IMPROVED DATA RELIABILITY

(75) Inventors: Anthony Fai, Palo Alto, CA (US);
Nicholas Seroff, Los Gatos, CA (US);
Nir Jacob Wakrat, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 332 days.

(21) Appl. No.: 13/175,610

(22) Filed: Jul. 1, 2011

(65) Prior Publication Data
US 2013/0007562 A1  Jan. 3, 2013

(51) Int. Cl.
*G11C 29/00* (2006.01)
*H04L 1/18* (2006.01)
*H03M 13/00* (2006.01)
*G01V 3/00* (2006.01)
*G01R 31/00* (2006.01)
*G11C 11/34* (2006.01)
*G11C 16/04* (2006.01)

(52) U.S. Cl.
USPC ........... 714/763; 714/718; 714/721; 714/748; 714/758; 714/768; 714/799; 324/314; 324/500; 365/201; 365/185.09; 365/185.03; 365/185.33; 365/185.24

(58) Field of Classification Search
USPC ......... 714/763, 718, 721, 748, 758, 768, 799, 714/6.1, 30, 42, 48; 324/314, 500; 365/201, 365/185.09, 185.03, 185.33, 185.24
See application file for complete search history.

(56) References Cited

U.S. PATENT DOCUMENTS

| | | | | |
|---|---|---|---|---|
| 5,124,943 A | * | 6/1992 | Lubarsky | 709/233 |
| 5,347,305 A | * | 9/1994 | Bush et al. | 348/14.01 |
| 5,390,545 A | * | 2/1995 | Doan | 73/650 |
| 5,475,609 A | * | 12/1995 | Apothaker | 700/292 |
| 5,504,776 A | * | 4/1996 | Yamaura et al. | 375/141 |
| 5,539,452 A | * | 7/1996 | Bush et al. | 348/14.13 |
| 6,545,852 B1 | * | 4/2003 | Arnold | 361/160 |
| 6,564,158 B1 | * | 5/2003 | Rabel et al. | 702/57 |
| 6,611,537 B1 | * | 8/2003 | Edens et al. | 370/503 |
| 6,751,570 B2 | * | 6/2004 | Boswell et al. | 702/121 |
| 6,999,291 B2 | * | 2/2006 | Andarawis et al. | 361/64 |
| 7,383,472 B2 | * | 6/2008 | Miura | 714/42 |
| 7,511,646 B2 | * | 3/2009 | Cornwell et al. | 341/126 |
| 7,532,830 B2 | * | 5/2009 | Kumar et al. | 399/44 |
| 7,551,486 B2 | * | 6/2009 | Cornwell et al. | 365/185.22 |
| 7,568,135 B2 | * | 7/2009 | Cornwell et al. | 714/721 |
| 7,580,634 B2 | * | 8/2009 | Takeuchi et al. | 398/38 |
| 7,613,043 B2 | * | 11/2009 | Cornwell et al. | 365/185.18 |
| 7,639,135 B2 | * | 12/2009 | Arms et al. | 340/572.1 |
| 7,639,531 B2 | * | 12/2009 | Cornwell et al. | 365/185.03 |
| 7,639,542 B2 | * | 12/2009 | Cornwell et al. | 365/185.2 |

(Continued)

FOREIGN PATENT DOCUMENTS

RU  2331987 C1 *  8/2008  ............ H03M 13/00

*Primary Examiner* — John J Tabone, Jr.
(74) *Attorney, Agent, or Firm* — Van Court & Aldridge LLP

(57) ABSTRACT

In one implementation, a memory device includes non-volatile memory, a memory controller communicatively coupled to the non-volatile memory over a first bus, and a host interface through which the memory controller communicates with a host device over a second bus. The memory device can also include a signal conditioner of the host interface adapted to condition signals to adjust a signal level of signals received over the second bus based on signal level data received from the host device, wherein the signal level data relates to a voltage level of signals generated by the host device to encode data transmitted across the second bus.

34 Claims, 5 Drawing Sheets

(56) References Cited

U.S. PATENT DOCUMENTS

| | | | |
|---|---|---|---|
| 7,701,797 B2 * | 4/2010 | Cornwell et al. | 365/226 |
| 7,773,022 B2 * | 8/2010 | Cornwell et al. | 341/156 |
| 7,852,674 B2 * | 12/2010 | Cornwell et al. | 365/185.03 |
| 7,852,690 B2 * | 12/2010 | Cornwell et al. | 365/189.2 |
| 7,859,908 B2 * | 12/2010 | Cornwell et al. | 365/185.22 |
| 7,881,108 B2 * | 2/2011 | Cornwell et al. | 365/185.09 |
| 7,911,834 B2 * | 3/2011 | Cornwell et al. | 365/185.03 |
| 7,974,132 B2 * | 7/2011 | Cornwell et al. | 365/185.2 |
| 8,000,134 B2 * | 8/2011 | Cornwell et al. | 365/185.03 |
| 8,116,133 B2 * | 2/2012 | Cornwell et al. | 365/185.03 |
| 8,127,202 B2 * | 2/2012 | Cornwell et al. | 714/764 |
| 8,130,788 B2 * | 3/2012 | Tsao | 370/465 |
| 8,159,897 B2 * | 4/2012 | Cornwell et al. | 365/226 |
| 8,355,284 B2 * | 1/2013 | Dudte et al. | 365/185.18 |
| 8,356,231 B2 * | 1/2013 | Cornwell et al. | 714/764 |
| 8,422,303 B2 * | 4/2013 | Franca-Neto et al. | 365/185.2 |
| 8,462,550 B2 * | 6/2013 | Cornwell et al. | 365/185.03 |
| 2003/0090953 A1 | 5/2003 | Kawai et al. | |
| 2003/0119174 A1 * | 6/2003 | Han et al. | 435/287.1 |
| 2003/0187520 A1 * | 10/2003 | Pearlman et al. | 700/11 |
| 2003/0235084 A1 | 12/2003 | Zumkehr et al. | |
| 2006/0267574 A1 * | 11/2006 | Howard | 324/103 R |
| 2007/0156293 A1 * | 7/2007 | Kellzi et al. | 701/1 |
| 2009/0279897 A1 * | 11/2009 | Takeuchi et al. | 398/137 |
| 2010/0102972 A1 * | 4/2010 | Middlekauff et al. | 340/576 |
| 2012/0134673 A1 * | 5/2012 | Palanisamy et al. | 398/58 |
| 2012/0166707 A1 * | 6/2012 | Franca-Neto et al. | 711/103 |
| 2012/0166897 A1 * | 6/2012 | Franca-Neto et al. | 714/721 |
| 2012/0215754 A1 * | 8/2012 | Marzani et al. | 707/705 |
| 2012/0323409 A1 * | 12/2012 | Wellbrook et al. | 701/3 |

* cited by examiner

CONTROLLER INTERFACE PROVIDING IMPROVED DATA RELIABILITY

BACKGROUND

This document relates to an interface of a controller of a memory device that provides improved signal integrity and/or improved data reliability.

Various types of non-volatile memory (NVM), such as flash memory (e.g., NAND flash memory, NOR flash memory), can be used for mass storage. For example, consumer electronics (e.g., portable media players) use flash memory to store data, including music, videos, images, and other media or types of information.

Memory controllers can be used to perform memory operations (e.g., program, read, erase) on NVM. Memory controllers can include a variety of components, such as processors, microprocessors, instructions (e.g., software-based program), hardware-based components (e.g., application-specific integrated circuits (ASICs)), volatile memory (e.g., random access memory (RAM)), or any combination thereof. A single memory controller can access multiple units of NVM, such as multiple memory dies (e.g., NAND flash memory dies), over a shared communications channel, such as a shared internal bus. Memory controllers can communicate with a host device through an interface and over a communication channel (e.g., a bus). A host device can provide a memory controller with commands to perform various memory operations on NVM that are accessible to the memory controller.

SUMMARY

This document generally describes technologies relating to an interface that provides improved signal and/or data reliability. Such an interface can be part of a memory device (e.g., contained within a memory device package) and can interface communication between a memory controller of the memory device and a host device (e.g., that uses the memory device to store data and accesses data stored on the memory device). An interface can include an impedance calibration circuit that calibrates signals driven by a memory device (e.g., a memory device package) so that a source impedance value associated with the driven signals matches, within a threshold value, load impedance associated with a host device interface. Such an impedance calibration circuit can perform impedance calibration when a memory device is in or is entering an idle state. Impedance calibration can be performed using a reference impedance signal provided by a host device and/or simulated by a memory device.

An interface can also (or alternatively) include a signal conditioner that is configured to condition signals received from a host device based on a reference voltage signal provided by the host device that indicates a center-point voltage for the host device. A center-point voltage can indicate a center-point between voltage ranges used by a host device to represent binary data values and can be used to adjust signals from the host device such that they align with voltage ranges used by a memory device.

An interface can also (or alternatively) include an error correction circuit that checks data transmitted by a host device to the interface for errors. Such an error correction circuit can check data from signals that have been conditioned by a signal conditioner. An error correction circuit can use a variety of techniques to perform error correction, such as cyclic redundancy check (CRC) algorithms. For instance, a host device may generate check values using a CRC algorithm that are appended to data chunks and transmitted to a memory device. An error correction circuit can use the check values to identify and correct errors. An interface can request retransmission of data chunks having uncorrectable errors (e.g., errors that an error correction circuit is unable to correct). If a threshold number of errors are received over a given time period, an interface can instruct a host device to reduce the data transmission rate over a bus over which the interface and the host device communicate.

In one implementation, a memory device includes non-volatile memory, a memory controller communicatively coupled to the non-volatile memory over a first bus, and a host interface through which the memory controller communicates with a host device over a second bus. The memory device can also include a signal conditioner of the host interface adapted to condition signals to adjust a signal level of signals received over the second bus based on signal level data received from the host device, wherein the signal level data relates to a voltage level of signals generated by the host device to encode data transmitted across the second bus.

In another implementation, a system includes a host device that includes a host controller and one or more non-volatile memory packages that are each communicatively coupled to the host device over one or more communication channels, wherein the host controller of the host device provides one or more commands to the non-volatile memory packages over the one or more communication channels. Each of the non-volatile memory packages can include non-volatile memory, a memory controller that is communicatively coupled to the non-volatile memory, and a host interface through which the memory controller communicates with a host device over the communication channel. Each of the non-volatile memory packages can also include a signal conditioner of the host interface adapted to condition signals to adjust a signal level of signals received over the communication channel based on signal level data received from the host device, wherein the signal level data relates to a voltage level of signals generated by the host device to encode data transmitted across the communication channel.

In another implementation, a method includes receiving, at an interface of a memory device, signals transmitted by a host device to the memory device over a bus, and receiving, at the interface of the memory device, signal level data from the host device that relates to one or more voltage levels of signals generated by the host device to encode data transmitted across the second bus. The method can also include conditioning, by the interface, the received signals based on the received signal level data from the host device.

Particular embodiments of the subject matter described in this specification can be implemented so as to realize one or more of the following advantages. Periodic impedance calibration by an interface can increase the integrity of signals transmitted between a host device and a memory device by reducing signal reflections. This can allow for data to be reliability transmitted at increased speeds across a bus between a host device and a memory device. Impedance calibrations initiated by an interface can allow for impedance calibrations to be carried out more frequently than when calibrations are initiated by a host device. An interface can perform impedance calibrations when a memory device is in or is entering an idle state, which can minimize or eliminate any degradation in performance that may be experienced while impedance calibration is taking place.

A signal conditioner can compensate for divergent voltage drift that may occur between a host device and a memory device by adjusting signals from the host device to match center-point voltages between the two devices. This can increase the accuracy and reliability with which data is transmitted over a bus by a host device and interpreted by a memory device.

An error correction circuit can correct transmitted errors without having to request retransmission of data from a host device. This can increase the throughput of data transmitted by a host device that is correctly interpreted by a memory device. When used in conjunction with a signal conditioner, an error correction circuit can reduce the number of uncorrectable errors that are encountered by a memory device, which can reduce the number of data retransmissions from a host device that are required. An error correction circuit can also increase data reliability by adjusting the speed with which data is transmitted over a bus based on a number of errors detected over a period of time. For example, in at least some cases, if errors detected over a one second period of time exceeds a threshold number, then the transmission speed can be reduced. In another example, in at least some cases, if errors detected over a one second period of time are less than a threshold number, then the transmission speed may be increased.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

An interface of a memory device can perform various actions to improve the integrity and reliability of signals (and data) transmitted between the memory device and a host device. Such an interface can include an impedance calibration circuit that periodically calibrates signals transmitted between a memory device and a host device so as to match source and load impedances for such transmissions. An interface can also include a signal conditioner that adjusts signals from a host device to compensate for any divergent voltage drift between the host device and a memory device. An error correction circuit can be included in an interface and used to correct various errors in transmissions between a host device and a memory device.

Figure 1:
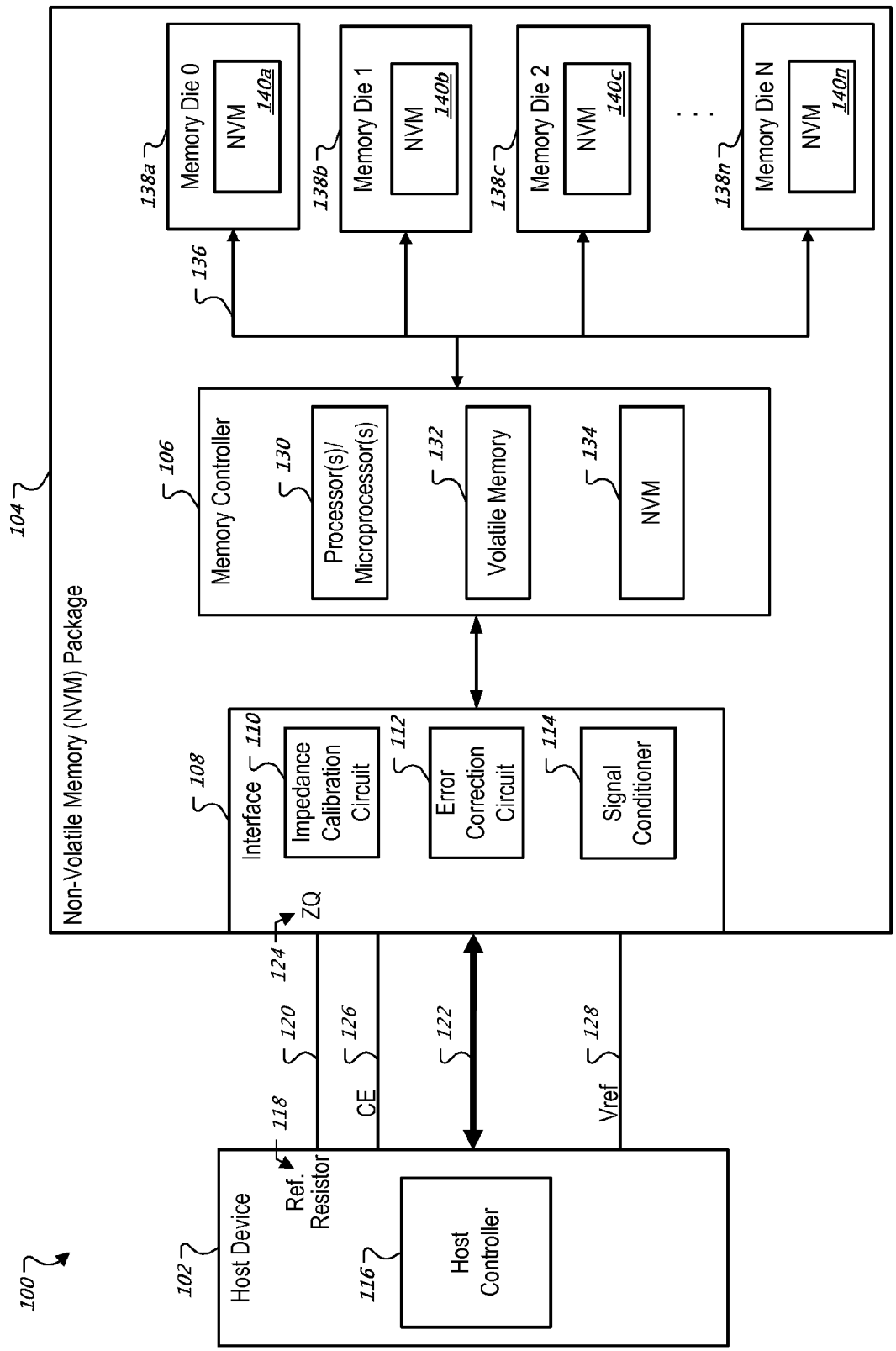
FIG. 1 is a diagram depicting an example system that includes a host device and a NVM package that includes a memory controller and an interface.

FIG. 1 is a diagram depicting an example system 100 that includes a host device 102 and a NVM package 104 that includes a memory controller 106 and an interface 108. The interface 108 includes a impedance calibration circuit 110, an error correction circuit 112, and a signal conditioner 114. The interface 108 can be part of and/or communicatively connected to the memory controller 106. The interface 108 can provide improved signal integrity and/or data reliability using the impedance calibration circuit 110, the error correction circuit 112, and/or the signal conditioner 114.

The host device 102 can be any of a variety of host devices and/or systems, such as a portable media player, a cellular telephone, a pocket-sized personal computer, a personal digital assistant (PDA), a desktop computer, a laptop computer, and/or a tablet computing device. The NVM package 104 includes NVM and can be a ball grid array package or other suitable type of integrated circuit (IC) package. The NVM package 104 can be part of (e.g., a component contained within the same overall product housing as the host device) and/or separate (e.g., a removable memory device) from the host device 102.

The host device 102 can include a host controller 116 that is configured to interact with the NVM package 104 to cause the NVM package 104 to perform various operations, such as read, write, and erase operations. The host controller 116 can include one or more processors and/or microprocessors that are configured to perform operations based on the execution of software and/or firmware instructions. Additionally and/or alternatively, the host controller 116 can include hardware-based components, such as application-specific integrated circuits (ASICs), that are configured to perform various operations. The host controller 116 can format information (e.g., commands, data) transmitted to the NVM package 104 according to a communications protocol shared between the host device 102 and the NVM package 104.

The host device 102 can include a reference resistor 118 that is configured to provide a preconfigured resistance over line 120 that simulates a load impedance associated with the host device 102. The reference resistor 118 can be preconfigured to provide a particular load impedance over the line 120 that is within a threshold value of a load impedance associated with the host device over communication channel 122 (e.g., bus) with the NVM package 104. A ZQ pin 124 (reference pin for impedance calibration) can be included in the interface 108 and can be connected to the reference resistor 118 over the line 120. The ZQ pin 124 has a variable source impedance that can be adjusted to match, within a threshold value, a load impedance provided by the reference resistor 118. In implementations where the reference resistor 118 is not provided by the host device 102, the ZQ pin 124 can be connected to a reference resistor that is local to the NVM package 104 (not depicted) and/or to ground. Such a local reference resistor can be preconfigured to provide a precise resistance that simulates a load impedance associated with the host device 102, like the reference resistor 118.

The host device 102 can provide a chip enable (CE) signal 126 to the interface 108. The CE signal 126, when asserted (also discussed as a "chip enable signal"), can indicate that the NVM package 104 should prepare and/or be ready to perform one or more commands provided by the host device 102 over the communication channel 122. The asserted CE signal 126 may cause the NVM package 104 to power on and/or boot. The CE signal 126, when deasserted (also discussed as a "chip disable signal"), can cause the NVM package 104 to prepare to power down (e.g., complete pending operations). The impedance calibration circuit 110 can monitor the CE signal 126 as an indication of when the NVM package 104 will be entering or leaving an idle state (a state when the NVM package 104 is idle). The impedance calibration circuit 110 can calibrate signals driven by the interface 108 using the ZQ pin 124 and the reference resistor 118 when the NVM package 104 is in an idle state, which can be indicated by a chip disable signal received from the host device 102. The reference resistor can have a predetermined resistance (e.g., 100 ohm, 120 ohm, 150 ohm, 200 ohm, 240 ohm, 320 ohm) that, in conjunction with the line 120, simulates load impedance for the host device 102 over the communication channel 122. The impedance calibration circuit 110 can calibrate the input and/or output resistance of the interface 108 of the NVM package 104 so as to match, within a threshold value (e.g., raw value, percentage), source and/or load impedance values for the host device 102 on the other side of the communication channel 122. For example, impedance calibration circuit 110 can adjust the output drive strength of the interface 108 so that the source impedance for the interface 108 matches the load impedance for the host device 102 within a threshold percentage (e.g., 1%, 2%, 5%, 10%, 15%, 25%, 33%).

The impedance calibration circuit 110 can be any of a variety of circuits that are configured to adjust source and/or load impedance values for the interface 108 of the NVM package 104. For example, the impedance calibration circuit 110 can include one or more resistance units (e.g., pull-up resistance units, pull-down resistance units) that include multiple transistors that can be individually toggled on and off so as to adjust input and/or output resistance for the interface 108. The impedance calibration circuit 110 can also include one or more comparators that compare a signal under test with a reference signal. The comparators can compare a variety of signal parameters, such as voltage, current, and/or impedance. For instance, when calibrating the output signal for the interface 108, a reference signal can be provided by the reference resistor 118 with the ZQ pin 124 and can be compared by one or more comparators with a signal that is output by the interface 108. The results of the comparators can be provided to one or more code counters that toggle transistors of the resistance units on and off based on the result of the comparator circuit. For instance, if impedance for the signal output by the interface 108 is greater than impedance for a reference signal provided by the reference resistor 118 and the ZQ pin 124, as indicated by one or more comparators, then the impedance calibration circuit 110 can toggle off one or more transistors used to drive the output signal under test, which can cause the output drive strength and associated impedance of the output signal to be decreased. Such comparing of signals and transistor toggling can be repeated until the signals are within a threshold impedance value of each other.

The impedance calibration circuits 110 can include or substitute other components, configurations, and/or impedance calibrating techniques.

The host device 102 can communicate with the NVM package 104 over the communication channel 122. The communication channel 122 between the host device 102 and the NVM package 104 the can be fixed (e.g., fixed communications channel) and/or detachable (e.g., a universal serial bus (USB) port). Interactions with the NVM package 104 can include providing commands (e.g., boot commands, read commands, write commands) to the NVM package 104.

The host device 102 and the NVM package 104 can transmit commands, data, and other information over the communication channel 122. To improve the reliability of information received by the NVM package 104 over the communication channel 122, the NVM package 104 can use the signal conditioner 114 and the error correction circuit 112. The signal conditioner 114 can use a voltage reference signal 128 provided by the host device 102 to the interface to condition signals received from the host device 102. Over time voltage levels used by the host device 102 and/or the NVM package 104 may drift and diverge. The voltage reference signal 128 can provide a center-point voltage that indicates a midpoint between voltage ranges that correspond to binary data values. The signal conditioner 114 can use the voltage reference signal 128 to determine whether and by how much voltage levels for the host device 102 and the NVM package 104 have diverged. Based on such a determination, the signal conditioner 114 can condition incoming signals over the communication channel 122 so that they correspond to voltage levels used by the NVM package 104. Signals can be adjusted by the signal conditioner 114 by providing offsets, corrective level shift, and/or gain to signals from the host device 102.

The error correction circuit 112 can use conditioned signals from the signal conditioner 114 and can correct various errors in the data received from the host device 102. For instance, the host device 102 can provide metadata with data transmissions that the error correction circuit 112 can use to perform error correction operations. In one example, the host device 102 can generate and provide check values (example metadata) for data chunks using one or more CRC algorithms. The error correction circuit 112 can include CRC circuitry that is configured to use the check values and to determine whether any errors exist in the received data chunks. If errors do exist, the CRC circuitry can attempt to correct them. If the error correction is unsuccessful, the CRC circuitry can request retransmission of the data chunk with the uncorrectable error.

The error correction circuit 112 can also cause the data transmission rate over the communication channel 122 to change depending on the rate at which errors are received from the host device 102. For instance, if the number of errors received over the previous second exceeds a first threshold, the error correction circuit 112 can cause the data rate to be reduced. However, if the number of errors received over the previous second is less than a second threshold, the error correction circuit 112 can cause the data rate to be increased. Various timeframes (e.g., fraction of a second, a second, a minute, an hour, a day) can be used to analyze whether the data rate should be adjusted.

The NVM package 104 can interact with the host device 102 over the communication channel 122 using a host device interface 108 and the memory controller 106. Like the host controller 116, the memory controller 106 can include one or more processors and/or microprocessors 130 that are configured to perform operations based on the execution of software and/or firmware instructions. Additionally and/or alternatively, the memory controller 106 can include hardware-based components, such as ASICs, that are configured to perform various operations. The memory controller 106 can perform a variety of operations, such as performing memory operations requested by the host device 102.

Various memory management functions, such as error correction and wear leveling, can be performed by the host controller 116 and the memory controller 106, alone or in combination. In implementations where the memory controller 106 is configured to perform at least some memory management functions, the NVM package 104 can be termed "managed NVM" (or "managed NAND" for NAND flash memory). This can be in contrast to "raw NVM" (or "raw NAND" for NAND flash memory), in which the host controller 116 external to the NVM package 104 performs memory management functions for the NVM package 104.

The memory controller 106 includes volatile memory 132 and NVM 134. The volatile memory 132 can be any of a variety of volatile memory types, such as cache memory and RAM. The volatile memory 132 can be used by the memory controller 106 to perform memory operations and/or to temporarily store data that is being read from and/or written to NVM. For example, the volatile memory 132 can store firmware and can use the firmware to perform operations on the NVM package 104 (e.g., read/write operations, debug operations). The NVM 134 can be used by the memory controller 106 to persistently store a variety of information, such as debug logs and instructions/firmware that the NVM package 104 uses to operate.

The memory controller 106 uses a shared internal bus 136 to access NVM used for persistent data storage. In the example system 100, such NVM is depicted as including multiple memory dies 138a-n that include NVMs 140a-n. The memory dies can be a variety of memory dies, such as integrated circuit (IC) dies. Although only the single shared bus 136 is depicted with regard to the NVM package 104, an NVM package can include more than one shared internal bus. Each internal bus can be connected to multiple memory dies (e.g., 2, 3, 4, 8, 32, etc.), as depicted with regard to the multiple memory dies 138a-n. The memory dies 138a-n can be physically arranged in a variety of configurations, such as being stacked. The NVM 140a-n can be any of a variety of NVM, such as NAND flash memory based on floating gate or charge trapping technology, NOR flash memory, erasable programmable read only memory (EPROM), electrically erasable programmable read only memory (EEPROM), ferroelectric RAM (FRAM), magnetoresistive RAM (MRAM), phase change memory (PCM), or any combination thereof. The memory controller 106 can perform various operations (e.g., read/write operations, debug operations, manufacturing test operations) on the NVM 140a-n.

The host device 102 can include an interface that is configured to calibrate impedance, condition signals, and/or correct errors over the communication channel 122, like the interface 108 of the NVM package 104. For instance, an interface of the host device 102 may include a impedance calibration circuit, similar to the impedance calibration circuit 110, that is configured to calibrate a signal output by the host device 122 over the communication channel 122 so as to match a source impedance for the host device 102 with a load impedance for the interface 108.

Figure 2:
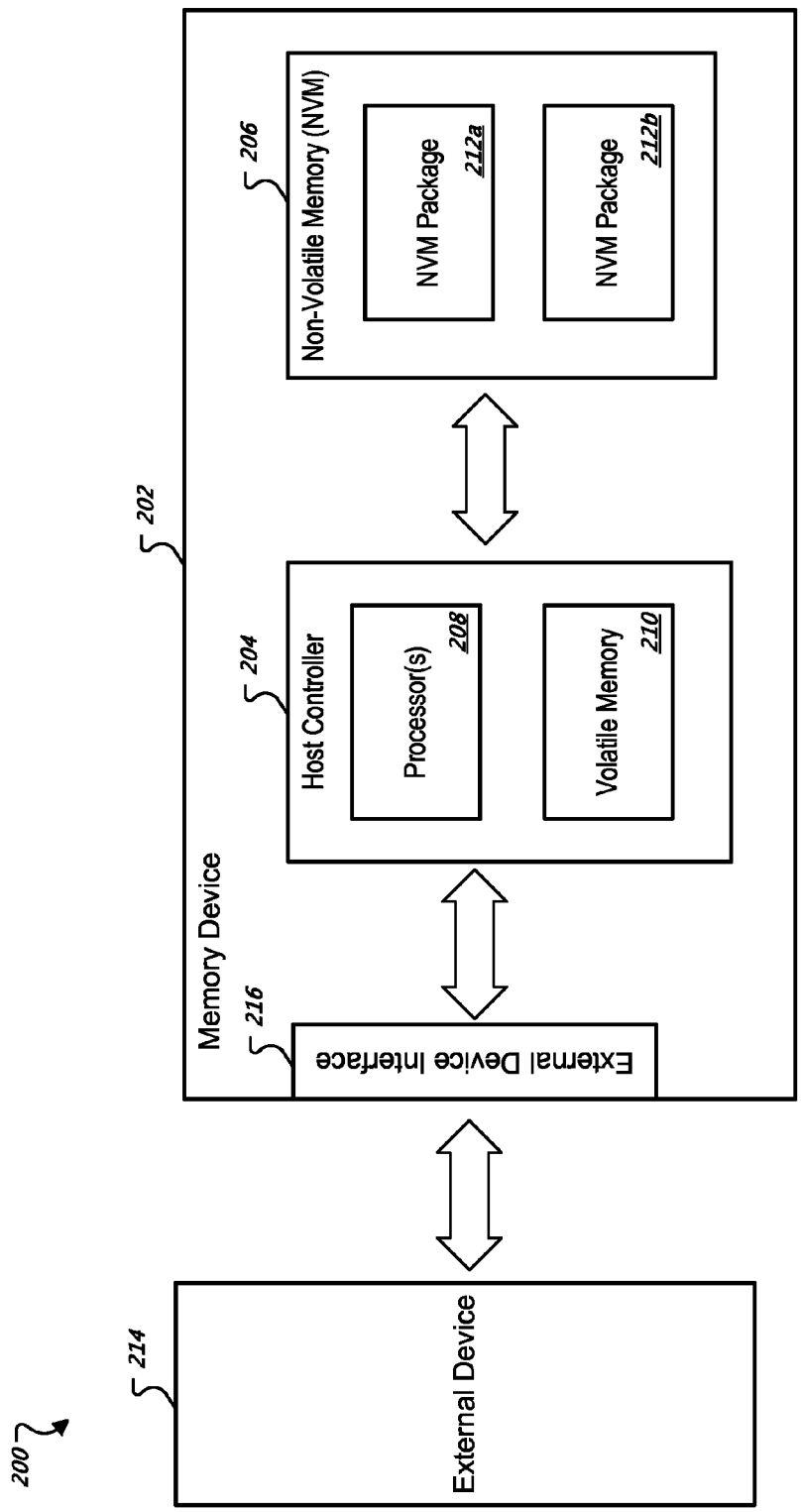
FIG. 2 is a diagram depicting an example system that includes a memory device with a host controller.

FIG. 2 is a diagram depicting an example system 200 that includes a memory device 202 with a host controller 204. The memory device 202 is similar to the system 100 described above with regard to FIG. 1, with the host controller 204 being similar to the host controller 116. As explained in greater detail below, the memory device 202 can include multiple NVM packages, such as the NVM package 104 described above with regard to FIG. 1. The memory device 202 can be any of a variety of memory devices, such as a portable media player, a cellular telephone, a pocket-sized personal computer, a personal digital assistant (PDA), a desktop computer, a laptop computer, a tablet computing device, and/or a removable/portable storage device (e.g., a flash memory card, a USB flash memory drive).

The example memory device 202 is depicted as including a host controller 204 and NVM 206. The host controller 204 can be similar to the host controller 116 described above with regard to FIG. 1. The host controller 204 includes one or more processors 208 and volatile memory 210. The processors 208 can be any variety of processors, such as microprocessors, central processing units (CPUs), graphics processing units (GPUs), or any combination thereof. The volatile memory 210 can be any of a variety of volatile memory, such as RAM and cache memory. The volatile memory 210 can be used by the processors 208 to perform various operations, such as retrieving and processing data stored in the NVM 206.

The NVM 206 can include one or more NVM packages 212a-b. The NVM packages 212a-b can each be similar to the NVM package 104 described above with regard to FIG. 1. For example, the NVM packages 212a-b can each include a plurality of memory dies with NVM (e.g., memory dies 138a-n and NVM 140a-n), one or more memory controllers (e.g., memory controller 106), and/or interfaces that are configured to provide improved data reliability and/or signal integrity (e.g., the interface 108). The NVM 206 can include any number of NVM packages (e.g., 2, 3, 4, 8, 16, etc.).

As described above with regard to FIG. 1, management of the NVM can be performed by the host controller 204 and/or controllers (not specifically shown in FIG. 2) of the NVM packages 212a-b. In implementations where controllers of the NVM packages 212a-b control at least a portion of the memory management operations (e.g., error correction, wear leveling, etc.), the NVM packages 212a-b may be considered to be "managed" NVM.

The system 200 is depicted as also including an external device 214 that can be communicatively connected (directly and/or indirectly) to the memory device 202. Communication between the external device 214 and the memory device 202 can include the transmission of data and/or instructions between the two devices. The external device 214 can be any of a variety of electronic devices, such as a desktop computer, a laptop computer, a server system, and a media computing device (e.g., a media server, a television, a stereo system). The memory device 202 can communicate with the external device 214 through a physical and/or wireless connection using an external device interface 216 (e.g., wireless chip, USB interface, etc.).

For instance, in one example implementation the memory device 202 can be a portable media player and the external device 214 can be a desktop computer that can transmit media files (e.g., audio files, video files, etc.) to each other over a physical connection (e.g., USB cable).

Figure 3:
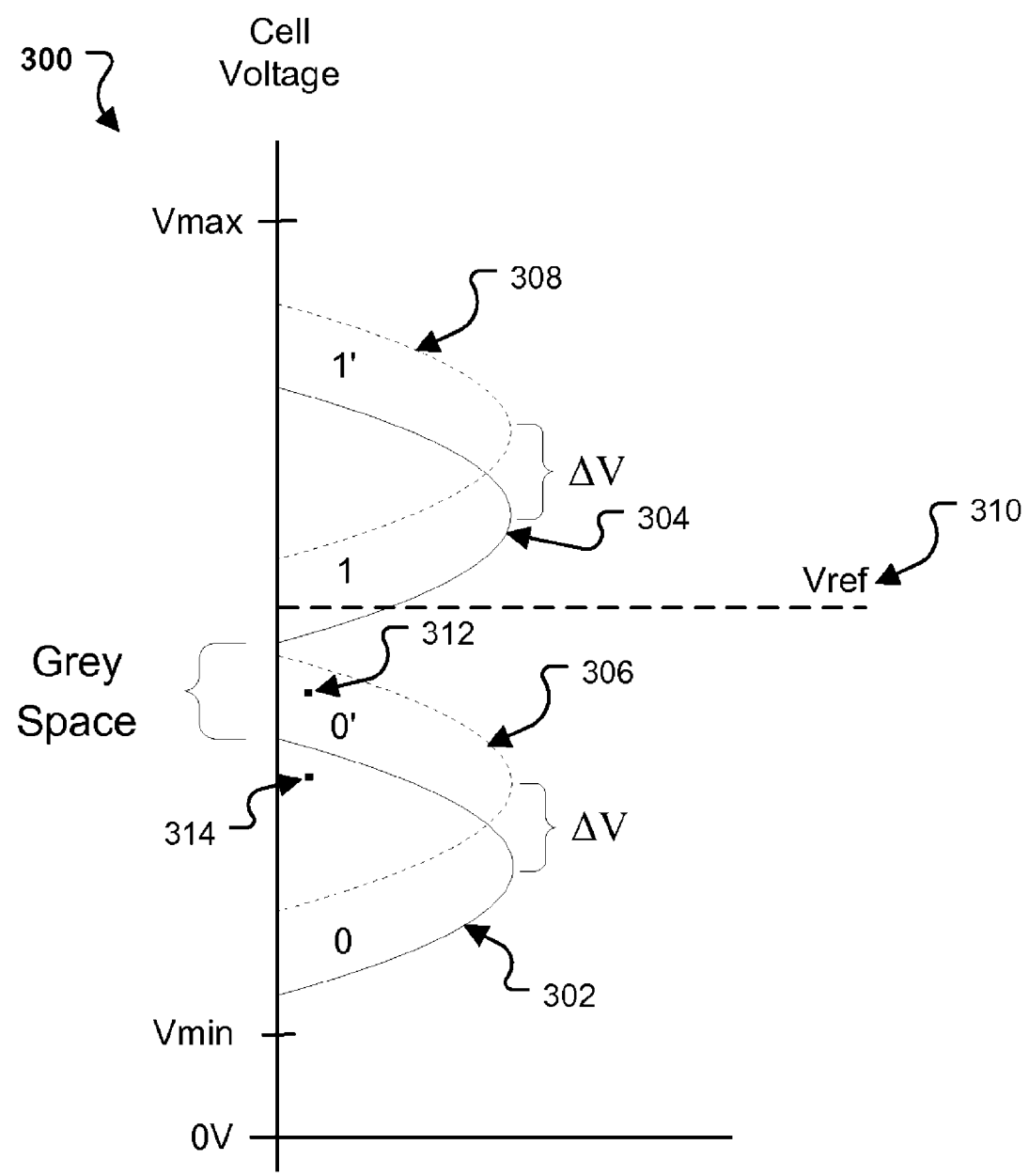
FIG. 3 depicts an example digital data value distribution based on divergent voltage levels used by a host device and a memory device.

FIG. 3 depicts an example digital data value distribution 300 based on divergent voltage levels used by a host device and a memory device. In this example, two sets of distinct voltage distribution curves are depicted—voltage distribution curves 302 and 304 (representing data values 0 and 1, respectively) and voltage distribution curves 306 and 308 (representing data values 0 and 1, respectively). The voltage distribution curves 302 and 304 can correspond to a memory device and the voltage distribution curves 306 and 308 can correspond to a host device, or vice versa.

An example center-point voltage level (Vref) 310 for the distribution curves 306 and 308 is depicted as being midway between the distribution curves 306 and 308. A signal conditioner (e.g., the signal conditioner 114) can use the center-point voltage 310 to infer the voltage distribution curves 306 and 308, and to condition signals received from the host device to correct for ΔV (difference between voltage levels used by a host device and a memory device). For instance, an example signal received from a host device may correspond to voltage level 312. When interpreted in light of the voltage distributions 306 and 308 used by the host device, the voltage level 312 corresponds to data value 0. However, when interpreted by a memory device that uses voltage distributions 302 and 304, the voltage level 312 can fall into a grey space between the distributions 302 and 304, and can be deemed to have an uncertain data value. Using the center-point voltage 310, the voltage level 312 can be conditioned to correct for ΔV and to correspond to voltage level 314, which falls within the voltage distribution 302 for data value 0. The center-point voltage can indicate a variety of information regarding the voltage distributions 306 and 308 used by the host device, such as a center point between voltage distributions, a center point of one or more voltage distributions, a center point of grey space between voltage distributions, and/or voltage levels that define grey space between voltage distributions.

Although ΔV is depicted in FIG. 3 as being uniform for the top voltage distribution curves 304 and 308, and the bottom voltage distribution curves 302 and 306, different ΔV values can exist across the top and bottom distribution curves. For instance, the bottom distribution curves 302 and 306 may differ by a smaller amount than the top distribution curves 304 and 308. Various techniques can be used to identify and correct for such different ΔV values using the center-point voltage level 310. For example, if voltage values that are less than the center-point voltage 310 routinely fall outside of the bottom distribution curve 302 but voltage values that are greater than the center-point voltage 310 routinely fall within the top distribution curve 304, then different ΔV values for the top and bottom distributions can be inferred. Separate signal conditioning techniques can be used for the top and bottom distributions and/or non-linear signal conditioning techniques can be used to adjust the top and bottom distribution curves by different amounts.

Although a single center-point voltage level 310 is depicted in FIG. 3, multiple center-point voltage levels can be used. For example, if multi-level signals are transmitted across a communication channel (e.g., the communication channel 122), then multiple center-point voltage levels can be provided to delineate a center-point between each of the levels. For instance, if voltage is transmitted using four different voltage distribution curves such that each distribution curve corresponds to two bits of data (e.g., four curves corresponding to 00, 01, 10, 11), then three center-point voltage levels may be used to identify a center-point voltage level between each of the distribution curves.

In another example, instead of using center-point voltage levels to correspond to a center-point between distribution curves, center-point voltage levels may also be used to correspond to a center-point in a voltage distribution curve. For instance, two center-point voltage levels could be provided for the digital data value distribution 300, one corresponding to a center-point of the top distribution curve 308 from the host and another corresponding to a center-point of the bottom distribution curve 306. Such separate center-point voltage levels may allow for easier correction of non-uniform ΔV values across the top and bottom distributions.

Figure 4:
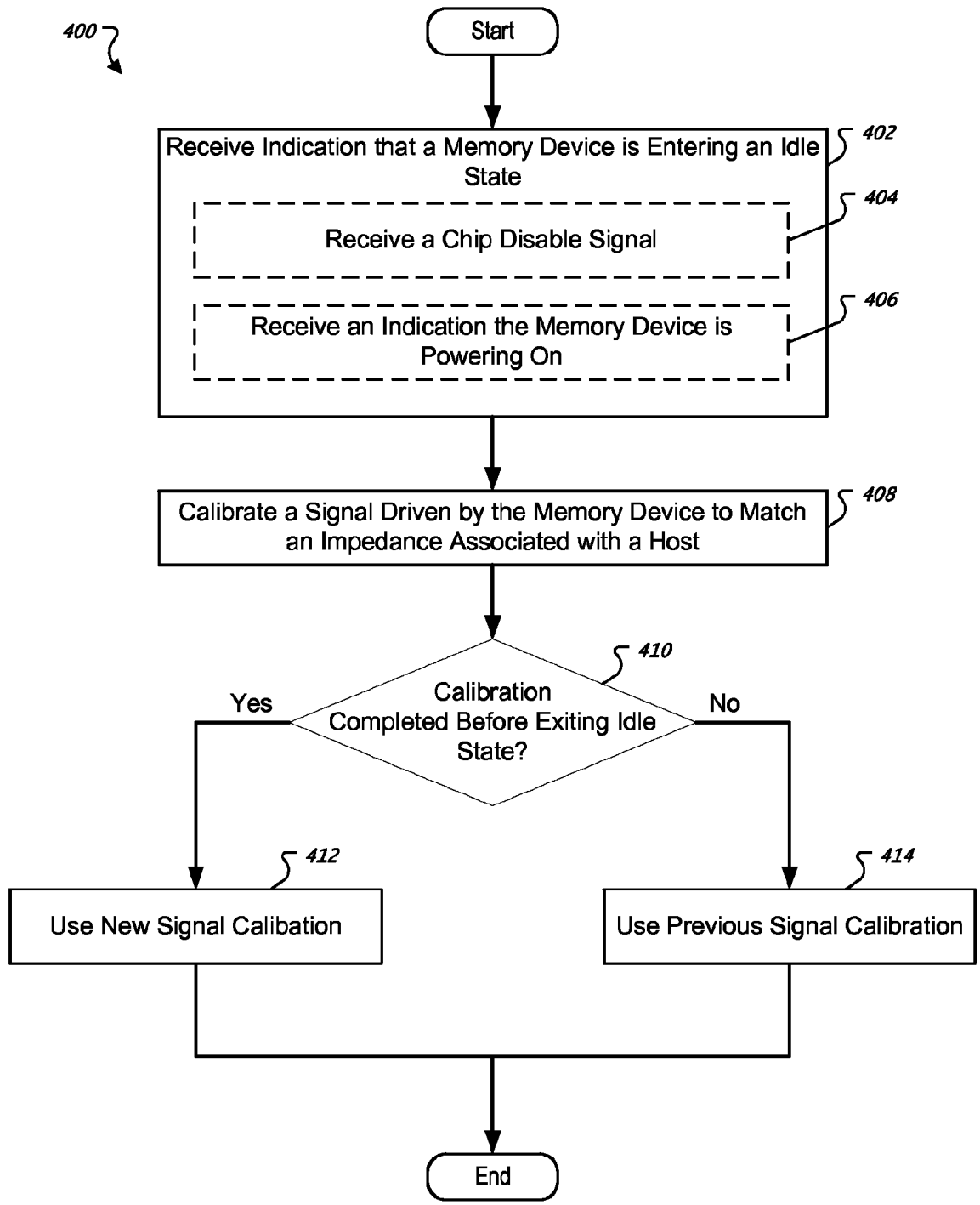
FIG. 4 is a flowchart depicting an example process for providing improved signal integrity for a memory device.

FIG. 4 is a flowchart depicting an example process 400 for providing improved signal integrity for a memory device. The process 400 can be performed by a variety of memory devices, such as the NVM package 104 described above with regard to FIG. 1 and/or the NVM packages 212a-b of the memory device 202 described above with regard to FIG. 2. In particular, the process 400 can be performed by the interface 108 of the NVM package 104.

The process 400 includes receiving, at a memory device, an indication that a memory device is entering an idle state (at 402). In some implementations, an idle state can be indicated by receipt of a chip disable signal (at 404). For example, the NVM package 104 can receive a chip enable deassertion signal ("chip disable signal") over the CE line 126. In some implementations, an idle state can be indicated by receiving an indication that the memory device is powering on from a previously unpowered state (at 406). Other indicators that the memory device is entering an idle state are also possible, such as the memory controller 106 providing a signal when it is currently idle.

In response to receiving the indication that the memory device is idle, a signal driven by the memory device can be calibrated to match (within a threshold value) an impedance associated with a host device (at 408). For example, the impedance calibration circuit 110 can calibrate the output drive strength (e.g., current) of a signal driven by the NVM package 104 across the communication channel 122. As described above with regard to FIG. 1, the drive strength can be adjusted so that source impedance for the signal driven by the impedance calibration circuit 110 can match, within a threshold value (e.g., raw value, percentage), reference load impedance that is provided using the ZQ pin 124 and the reference resistor 118.

Calibration may take an extended period of time (e.g., several clock cycles). Calibration may only be initiated if there is an indication that the idle state is likely to persist for at least the extended period of time that it takes for calibration to be completed. For instance, a chip disable signal may indicate that a memory device is likely to be idle for an extended period of time, but an indication from a memory controller that the memory device is currently idle (e.g., not actively performing an operation) may carry no such indication of the device being idle into the future for an extended period of time. For example, a memory device may remain idle until a chip enable signal (chip enable assertion) is received from a host device. In contrast, a memory controller may begin to perform a memory operation (e.g., received from a host device, performed as part of a memory management operation) immediately after providing an indication that it is currently idle.

In response to receiving an indication that the memory device is exiting the idle state, a determination can be made as to whether the calibration was/will be completed before the device exits the idle state (at 410). For example, reassertion of the CE signal 126 by the host device 102 can indicate that the NVM package 104 is exiting an idle state. In another example, a ready signal provided by the NVM package 104 over a ready/busy line after the NVM package 104 has powered on can indicate that the NVM package is exiting an idle state.

If the calibration is completed before exiting the idle state, then the new signal calibration can be used by the memory device (at 412). For example, if the impedance calibration circuit 110 is able to calibrate the signal drive strength using the ZQ pin 124 and the reference resistor 118 before the NVM package 104 exits an idle state, then the calibration for the drive strength can be used for communication over the communication channel 122 during operation of the NVM package 104.

If the calibration did not complete before exiting the idle state, then a previous signal calibration can be used by the memory device (at 414). For example, if the impedance calibration circuit 110 is not able to calibrate the signal drive strength using the ZQ pin 124 using the reference resistor 118 before the NVM package 104 exits an idle state, then the partially completed calibration can be discarded and a previous calibration of the drive strength (a calibration used prior to the NVM package 104 entering an idle state) can be used for communication over the communication channel 122 during operation of the NVM package 104. As described above, calibration can take an extended period of time and may tie-up various components of the NVM package 104, such as the interface 108 and/or the impedance calibration circuit 110. Waiting for calibration to complete may cause operations performed by the NVM package 104 to be delayed, such as interacting with the host device 102 over the communication channel 122. To minimize delays, a partially completed calibration can be discarded so that operations of the NVM package 104 can proceed without delay. In some implementations, operations can be delayed in order to complete impedance calibration (e.g., partially completed calibrations will continue until completion) of the signal driven by the NVM package 104 so that the integrity of the signal is increased and the speed with which data is transmitted over the communication channel 122 can be increased.

The process 400 can be repeated whenever a memory device enters an idle state—allowing for periodic calibration of the drive strength so as to improve signal integrity and minimize signal reflections.

Figure 5:
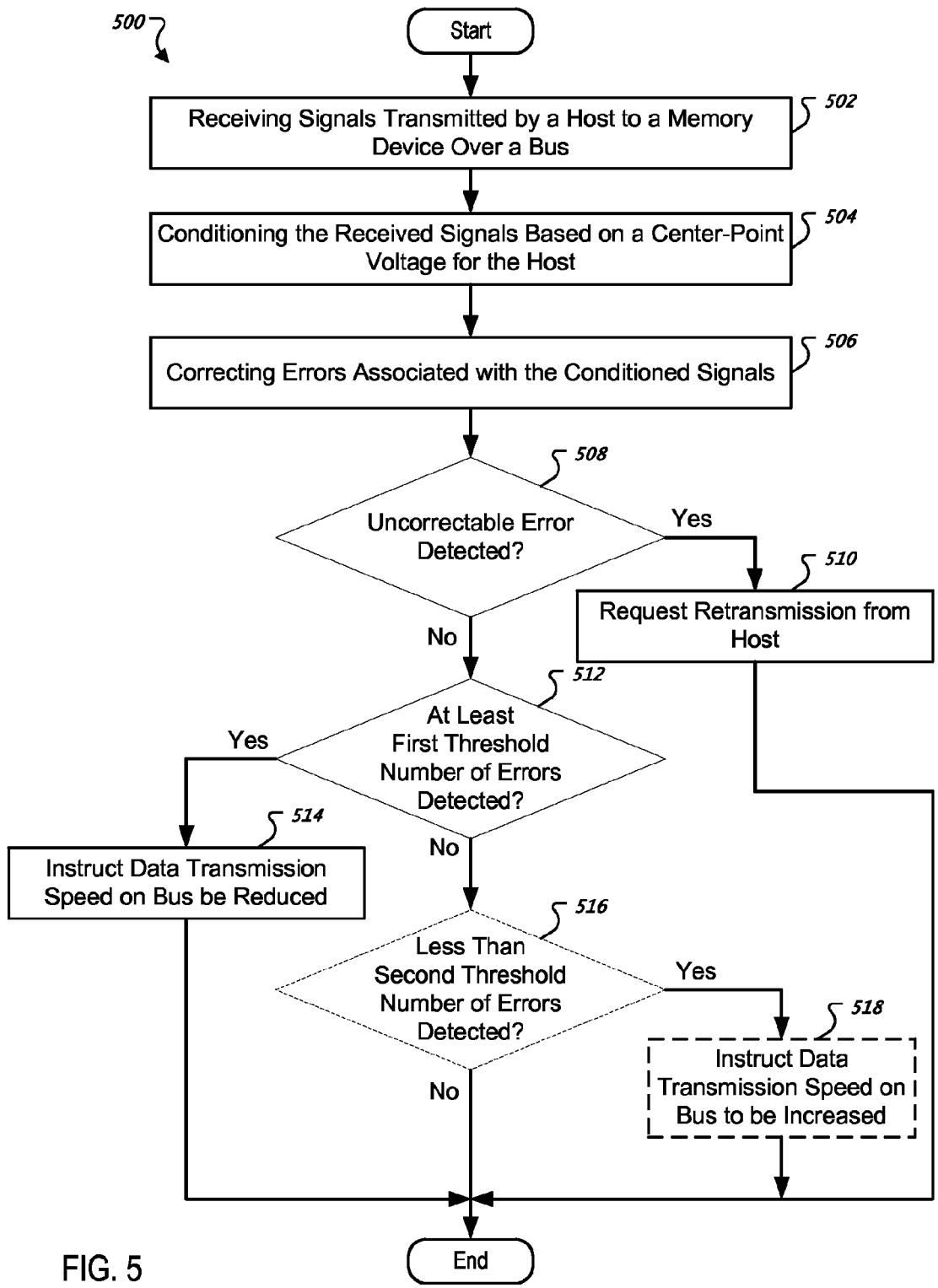
FIG. 5 is a flowchart depicting an example process for providing improved data reliability for a memory device.

FIG. 5 is a flowchart depicting an example process 500 for providing improved data reliability for a memory device. The process 500 can be performed by a variety of memory devices, such as the NVM package 104 described above with regard to FIG. 1 and/or the NVM packages 212a-b of the memory device 202 described above with regard to FIG. 2. In particular, the process 500 can be performed by the interface 108 of the NVM package 104.

The process 500 includes receiving signals transmitted by a host device to a memory device over a bus (at 502). For example, the host device 102 can transmit data over the communication channel 122 to the NVM package 104. The data can be received at the interface 108 of the NVM package 104.

The received signals can be conditioned based on a center-point voltage for the host device (at 504). For example, the host device 102 can provide the Vref signal 128 to the NVM package 104 that indicates a center-point voltage used by the host device 102. The signal conditioner 114 can condition signals received from the host device based on a difference between the provided center-point voltage from the host device 102 (Vref 128) and a center-point voltage for the NVM package 104. Signal conditioning can involve a variety of adjustments, such as providing offsets, corrective level shift, and/or gain to signals from the host device 102.

Errors can be detected and corrected using the conditioned signals (at 506). For example, the error correction circuit 112 can correct errors using the conditioned signals provided by the signal conditioner 114. Data transmitted by the host device 102 over the communication channel 122 can include various associated metadata, such as one or more redundant bits (e.g., check values), that can be used to detect and/or correct errors in the data.

If an uncorrectable error is detected (at 508), then a request can be provided to the host device for retransmission of the data that contained the uncorrectable error (at 510). For example, in response to the error correction circuit 112 detecting an uncorrectable error, the interface 108 can transmit a request to the host device 102 for retransmission of the data that contained the error over the communication channel 122.

If an uncorrectable error is not detected, a determination can be made as to whether at least a first threshold number of errors have been detected (at 512). The first threshold number of errors (e.g., raw number, percentage) can be judged against various errors (e.g., any error, uncorrectable errors, correctable errors) detected over a period of time. A first threshold number of errors can indicate that some aspect of communication with a host device is producing unreliable data transmissions between the host device and a memory device. Accordingly, if such a condition is detected, a memory device can adjust various settings to produce more reliable data transmissions. For example, if the first threshold number of errors are detected (at 512), then an instruction can be provided to the host device to reduce the data transmission speed on the bus (at 514). For example, the NVM package 104 can provide an instruction to the host device 102 to reduce the data transmission rate over the communication channel 122. Other techniques can be used to decrease the error rate, such as instructing the signal conditioner 114 to adjust the mechanism(s) that are used to condition signals received from the host device.

In some implementations, the process 500 also includes determining whether less than a second threshold number of errors have been detected (at 516). Such a determination can examine a number of errors detected over a period of time (e.g., one second, one minute). Detection of fewer than the second threshold of errors can indicate that the signal integrity at the current data transmission rate is good (few errors) and that bus speed can be increased. If less than the second threshold of errors is detected, then an instruction can be provided to the host device to increase the data transmission speed on the bus (at 518). For example, if data is being transmitted by the host device 102 over the communication channel 122 with few if any errors, then the NVM package 104 can attempt increase the data throughput over the communication channel 122 by increasing the transmission speed over the communication channel 122 (if an increase is supported by the host device 102 and the NVM package 104). The second threshold can be less than the first threshold.

The process 500 can be repeated whenever a memory device, such as the NVM package 104, receives a signal from a host device, such as the host device 102.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. Moreover, other mechanisms for improving signal integrity and data reliability can be used. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A memory device comprising:
non-volatile memory;
a memory controller communicatively coupled to the non-volatile memory over a first bus;
a host interface through which the memory controller communicates with a host device over a second bus; and
a signal conditioner of the host interface adapted to condition signals to adjust a signal level of signals received over the second bus based on signal level data received from the host device, wherein the signal level data relates to a voltage level of signals generated by the host device to encode data transmitted across the second bus.

2. The memory device of claim 1, wherein signal level data includes one or more center-point voltages that indicate one or more center-points between voltage ranges used by the host device to represent data values.

3. The memory device of claim 2, wherein the one or more center-point voltages include one center-point voltage indicating a center point between binary data values transmitted by the host device.

4. The memory device of claim 2, wherein the one or more center-point voltages include multiple center-point voltages indicating multiple center points between multi-level data values transmitted by the host device.

5. The memory device of claim 2, wherein the signal conditioner adjusts the signals received over the second bus based on a difference between the one or more center-point voltages provided by the host device and one or more center-point voltages used by the memory device.

6. The memory device of claim 1, further comprising a reference voltage pin of the host interface that is configured to provide the signal level data from the host device.

7. The memory device of claim 1, further comprising an error correction circuit of the host interface that, using the conditioned signals from the signal conditioner, corrects errors associated with data chunks transmitted over the second bus based on one or more bits of metadata transmitted with the data chunks.

8. The memory device of claim 7, wherein the error correction circuit includes a cyclic redundancy check (CRC) circuit.

9. The memory device of claim 8, wherein the metadata includes a check value that is generated by the host device for each of the data chunks using a CRC encoding algorithm.

10. The memory device of claim 7, wherein, when an uncorrectable error is detected in a particular data chunk, the error correction circuit transmits a request for retransmission of the particular data chunk.

11. The memory device of claim 7, wherein, when a number of errors detected by the error correction circuit over a particular time period exceed a threshold number, the error correction circuit instructs the host device to reduce a data transmission speed associated with the second bus.

12. The memory device of claim 7, wherein, when a number of errors detected by the error correction circuit over a particular time period are less than a threshold number, the error correction circuit instructs the host device to increase a data transmission speed associated with the second bus.

13. A system comprising:
a host device that includes a host controller; and
one or more non-volatile memory packages that are each communicatively coupled to the host device over one or more communication channels, wherein the host controller of the host device provides one or more commands to the non-volatile memory packages over the one or more communication channels, wherein each of the non-volatile memory packages includes:
non-volatile memory;
a memory controller that is communicatively coupled to the non-volatile memory;
a host interface through which the memory controller communicates with a host device over the one or more communication channels; and
a signal conditioner of the host interface adapted to condition signals to adjust a signal level of signals received over the one or more communication channels based on signal level data received from the host device, wherein the signal level data relates to a voltage level of signals generated by the host device to encode data transmitted across the one or more communication channels.

14. The system of claim 13, wherein signal level data includes one or more center-point voltages that indicate one or more center-points between voltage ranges used by the host device to represent data values.

15. The system of claim 14, wherein the one or more center-point voltages include one center-point voltage indicating a center point between binary data values transmitted by the host device.

16. The system of claim 14, wherein the one or more center-point voltages include multiple center-point voltages indicating multiple center points between multi-level data values transmitted by the host device.

17. The system of claim 14, wherein the signal conditioner adjusts the signals received over the one or more communication channels based on a difference between the one or more center-point voltages provided by the host device and one or more center-point voltages used by the memory device.

18. The system of claim 13, further comprising a reference voltage pin of the host interface that is configured to provide the signal level data from the host device.

19. The system of claim 13, wherein each of the non-volatile memory packages further include:
an error correction circuit of the host interface that, using the conditioned signals from the signal conditioner, corrects errors associated with data chunks transmitted over the one or more communication channels based on one or more bits of metadata transmitted with the data chunks.

20. The system of claim 19, wherein the error correction circuit includes a CRC circuit.

21. The system of claim 20, wherein the metadata includes a check value that is generated by the host device for each of the data chunks using a CRC encoding algorithm.

22. The system of claim 19, wherein, when an uncorrectable error is detected in a particular data chunk, the error correction circuit transmits a request for retransmission of the particular data chunk.

23. The system of claim 19, wherein, when a number of errors detected by the error correction circuit over a particular time period exceed a threshold number, the error correction circuit instructs the host device to reduce a data transmission speed associated with the one or more communication channels.

24. The system of claim 19, wherein, when a number of errors detected by the error correction circuit over a particular time period are less than a threshold number, the error correction circuit instructs the host device to increase a data transmission speed associated with the one or more communication channels.

25. A method comprising:
receiving, at an interface of a memory device, signals transmitted by a host device to the memory device over a bus;
receiving, at the interface of the memory device, signal level data from the host device that relates to one or more voltage levels of signals generated by the host device to encode data transmitted across the bus; and
conditioning, by the interface, the received signals based on the received signal level data from the host device.

26. The method of claim 25, wherein the received signal is conditioned by a signal conditioner that is part of the interface of the memory device.

27. The method of claim 25, wherein signal level data includes one or more center-point voltages that indicate one or more center-points between voltage ranges used by the host device to represent data values.

28. The method of claim 27, wherein the signals are conditioned based on a difference between the one or more center-point voltages provided by the host device and one or more center-point voltages used by the memory device.

29. The method of claim 25, further comprising correcting, by the interface and using the conditioned signals, errors associated with data chunks transmitted over the bus based on one or more bits of metadata transmitted with the data chunks.

30. The method of claim 29, wherein errors associated with the data chunks are conditioned by an error correction circuit that is part of the interface of the memory device.

31. The method of claim 29, wherein the errors are corrected with a CRC algorithm using check values that are generated by the host device for each of the data chunks and that are included in the metadata.

32. The method of claim 29, further comprising transmitting a request to the host device for retransmission of a particular data chunk in response to detecting an error associated with the particular data chunk that is uncorrectable.

33. The method of claim 29, further comprising instructing the host device to reduce a data transmission speed associated with the bus in response to detecting greater than a threshold number of errors in data transmitted by the received signals over a time period.

34. The method of claim 29, further comprising instructing the host device to increase a data transmission speed associated with the bus in response to detecting less than a threshold number of errors in data transmitted by the received signals over a time period.

* * * * *